(12) United States Patent
Inoue et al.

(10) Patent No.: US 12,341,192 B2
(45) Date of Patent: Jun. 24, 2025

(54) POSITIVE ACTIVE MATERIAL FOR NONAQUEOUS ELECTROLYTE SECONDARY BATTERY, POSITIVE ELECTRODE FOR NONAQUEOUS ELECTROLYTE SECONDARY BATTERY, AND NONAQUEOUS ELECTROLYTE SECONDARY BATTERY

(71) Applicants: BASF TODA Battery Materials LLC, Tokyo (JP); GS YUASA INTERNATIONAL LTD., Kyoto (JP)

(72) Inventors: Taisei Inoue, Yamaguchi (JP); Daisuke Nishikawa, Yamaguchi (JP); Katsuya Inoue, Kyoto (JP)

(73) Assignees: BASF TODA Battery Materials LLC, Tokyo (JP); GS YUASA INTERNATIONAL LTD., Kyoto (JP)

( * ) Notice: Subject to any disclaimer, the term of this patent is extended or adjusted under 35 U.S.C. 154(b) by 721 days.

(21) Appl. No.: 17/429,964

(22) PCT Filed: Sep. 27, 2019

(86) PCT No.: PCT/JP2019/038366
§ 371 (c)(1),
(2) Date: Aug. 11, 2021

(87) PCT Pub. No.: WO2020/188864
PCT Pub. Date: Sep. 24, 2020

(65) Prior Publication Data
US 2022/0140334 A1    May 5, 2022

Related U.S. Application Data

(60) Provisional application No. 62/819,187, filed on Mar. 15, 2019.

(51) Int. Cl.
| | | |
|---|---|---|
| H01M 4/525 | (2010.01) | |
| H01M 4/02 | (2006.01) | |
| H01M 4/1391 | (2010.01) | |
| H01M 10/052 | (2010.01) | |
| H01M 10/0568 | (2010.01) | |
| H01M 10/0569 | (2010.01) | |

(52) U.S. Cl.
CPC ......... *H01M 4/525* (2013.01); *H01M 4/1391* (2013.01); *H01M 10/052* (2013.01);
(Continued)

(58) Field of Classification Search
CPC .................................................. H01M 4/525
See application file for complete search history.

(56) References Cited

U.S. PATENT DOCUMENTS 11,011,746 B2    5/2021  Park et al.
2013/0277604 A1*  10/2013  Shimokita ............. H01M 4/362
                                                         429/223

(Continued)

FOREIGN PATENT DOCUMENTS

JP    2014-10909 A    1/2014
JP    2014-44928 A    3/2014

(Continued)

OTHER PUBLICATIONS

International Search Report (ISR) dated Dec. 10, 2019 filed in PCT/JP2019/038366.

*Primary Examiner* — Maria Laios
*Assistant Examiner* — Jordan E Berresford
(74) *Attorney, Agent, or Firm* — RANKIN, HILL & CLARK LLP

(57) ABSTRACT

Provided is a "lithium-excess-type" active material in which a decrease in potential associated with a charge-discharge cycle is suppressed. Disclosed is a positive active material for a nonaqueous electrolyte secondary battery containing a lithium transition metal composite oxide. In this positive active material, the lithium transition metal composite oxide (Continued)

has an α-NaFeO$_2$ structure, a molar ratio Li/Me of Li to a transition metal (Me) is 1.25≤Li/Me≤1.45, Ni and Mn are contained as the transition metal (Me), an X-ray diffraction pattern attributable to a space group R3-m is included, and a half-value width for a diffraction peak of a (104) plane at a Miller index hkl in X-ray diffraction measurement using a CuKα ray is 0.27° or less.

20 Claims, 3 Drawing Sheets

(52) U.S. Cl.
CPC ... *H01M 10/0568* (2013.01); *H01M 10/0569* (2013.01); *H01M 2004/028* (2013.01)

(56) References Cited

U.S. PATENT DOCUMENTS

| | | |
|---|---|---|
| 2013/0313471 A1 | 11/2013 | Endo et al. |
| 2014/0038053 A1 | 2/2014 | Endo et al. |
| 2014/0193714 A1 | 7/2014 | Kim et al. |
| 2015/0008364 A1 | 1/2015 | Endo |
| 2015/0064558 A1 | 3/2015 | Seki et al. |
| 2015/0118562 A1 | 4/2015 | Nakano et al. |
| 2017/0018767 A1 | 1/2017 | Park et al. |
| 2017/0117544 A1* | 4/2017 | Endo .......... H01M 4/0471 |
| 2018/0145318 A1 | 5/2018 | Endo et al. |
| 2019/0221839 A1 | 7/2019 | Inoue et al. |

FOREIGN PATENT DOCUMENTS

| | | |
|---|---|---|
| JP | 2014-44945 A | 3/2014 |
| JP | 2014-132572 A | 7/2014 |
| JP | 2015-84303 A | 4/2015 |
| JP | 2015-228353 A | 12/2015 |
| JP | 2016-143447 A | 8/2016 |
| JP | 2016-219278 A | 12/2016 |
| JP | 2018-98174 A | 6/2018 |
| KR | 20140069567 A | 6/2014 |
| KR | 20170008164 A | 1/2017 |
| WO | 2013/121654 A1 | 8/2013 |
| WO | 2016/190419 A1 | 12/2016 |
| WO | 2018/012385 A1 | 1/2018 |

* cited by examiner

POSITIVE ACTIVE MATERIAL FOR NONAQUEOUS ELECTROLYTE SECONDARY BATTERY, POSITIVE ELECTRODE FOR NONAQUEOUS ELECTROLYTE SECONDARY BATTERY, AND NONAQUEOUS ELECTROLYTE SECONDARY BATTERY

TECHNICAL FIELD

The present invention relates to a positive active material for a nonaqueous electrolyte secondary battery, a positive electrode for a nonaqueous electrolyte secondary battery containing the positive active material, and a nonaqueous electrolyte secondary battery including the positive electrode.

BACKGROUND ART

Heretofore, in a nonaqueous electrolyte secondary battery, as a lithium transition metal composite oxide used for a positive active material, a "$LiMeO_2$-type" active material (wherein Me is a transition metal) having an $\alpha$-$NaFeO_2$-type crystal structure has been examined, and $LiCoO_2$ has been widely put to practical use. The nonaqueous electrolyte secondary battery using $LiCoO_2$ as a positive active material has a discharge capacity of about 120 to 130 mAh/g.

Various "$LiMeO_2$-type" active materials having a larger discharge capacity and excellent charge-discharge cycle performance have been proposed and partially put to practical use. For example, $LiNi_{1/2}Mn_{1/2}O_2$ and $LiCo_{1/3}Ni_{1/3}Mn_{1/3}O_2$ have a discharge capacity of 150 to 180 mAh/g.

As the Me, it has been desired to use Mn that is abundant as an earth resource. However, the "$LiMeO_2$-type" active material in which a molar ratio Mn/Me of Mn to Me is more than 0.5 has a problem that a structural change from an $\alpha$-$NaFeO_2$-type to a spinel type occurs with charging, a crystal structure cannot be maintained, and charge-discharge cycle performance is remarkably deteriorated.

Thus, in recent years, with respect to the "$LiMeO_2$-type" active material as described above, a so-called "lithium-excess-type" active material has been proposed as a lithium transition metal composite oxide, in which a molar ratio Li/Me of lithium to the transition metal (Me) is more than 1, the molar ratio Mn/Me of manganese (Mn) is more than 0.5, and an $\alpha$-$NaFeO_2$ structure can be maintained even when charge is performed. This active material can be represented by $Li_{1+\alpha}Me_{1-\alpha}O_2$ ($\alpha$>0), and studies have been conducted on its composition, crystallinity, powder characteristics, and a relationship between a production method and the like and battery characteristics (see Patent Documents 1 to 5).

Patent Document 1 describes "A positive active material for a lithium secondary battery, comprising a lithium transition metal composite oxide having an $\alpha$-$NaFeO_2$ structure, wherein in the lithium transition metal composite oxide, a transition metal (Me) includes Co, Ni and Mn, a molar ratio (Li/Me) of Li and the transition metal (Me) is 1.15≤Li/Me≤1.24, a molar ratio (Mn/Me) of Mn in the transition metal is 0.52≤Mn/Me≤0.66, and when a space group R3-m is used for a crystal structure model based on an X-ray diffraction pattern, a half-value width (FWHM (104)) for a diffraction peak attributed to a (104) plane is 0.285≤FWHM (104)≤0.335." (claim 1).

It is further described that "when the value of Li/Me increases, an amount of Li contained in a Me layer relatively increases, and therefore, as the charge-discharge cycle progresses, the structural change from the layered crystal structure to the spinel crystal structure progresses, which is considered to cause a decrease in OCV. Thus, the present inventors have searched for a composition ratio excellent in OCV stability while taking advantage of high energy density, and found that the composition ratio is preferably in a range of 1.15≤Li/Me≤1.24, and more preferably in a range of 1.15≤Li/Me≤1.20." (paragraph [0017]), and that the OCV measurement was performed at a charge voltage of 4.45 V (paragraphs [0083] and [0084]), and it is further described that "In the batteries of Comparative Examples 4 to 6 in which Li/Me exceeds 1.24 and the FWHM (104) is small, although the energy density is high, the OCV retention rate sharply decreases." and that "On the other hand, the batteries of Examples 1 to 3 in which the range of Li/Me is 1.15 to 1.24 and the FWHM (104) is 0.302 to 0.320 have a high OCV retention rate while maintaining a high energy density which is a characteristic of a "lithium-excess-type" active material." (paragraph [0091]).

Patent Document 2 describes that "A positive active material comprising: a lithium metal oxide comprising combined two domains and represented by the following chemical formula 1:

$x[Li_{2-y}(M1)_{1-z}(M2)_{y+z}O_3]\text{-}(1-x)[LiMeO_2]$     [CHEM. 1]

in the chemical formula 1, 0<x<1, 0<y<1, 0<z<1, 0<y+z<1, the M1 is a transition metal, the M2 is one or more metals selected from the group consisting of Mg, Al, V, Zn, Mo, Nb, La, and Ru, and the Me is one or more selected from the group consisting of Ni, Co, Mn, Fe, Cr, Ti, Cu, Al, Mg, Zr, and B." (claim 1).

It is further described that "the positive active material includes the lithium metal oxide in which two domains are combined, and a part of lithium or transition metal contained in one of the two domains is doped with a different element, whereby a discharge voltage drop of a lithium battery containing the positive active material is suppressed, and life characteristics are improved." (paragraph [0037]). In addition, a positive active material is described in which only a first domain lithium metal oxide of each of Example 1: $0.5[Li_{1.9375}MnAl_{0.0625}O_3]\text{-}0.5[Li(Ni_{0.33}Co_{0.33}Mn_{0.33})O_2]$, Example 2: $0.5[Li_{1.875}MnAl_{0.125}O_3]\text{-}0.5[Li(Ni_{0.33}Co_{0.33}Mn_{0.33})O_2]$, Example 3: $0.5[Li_{1.75}MnAl_{0.25}O_3]\text{-}0.5[Li(Ni_{0.33}Co_{0.33}Mn_{0.33})O_2]$, Example 4: $0.5[Li_2Mn_{0.9375}V_{0.0625}O_3]\text{-}0.5[Li(Ni_{0.33}Co_{0.33}Mn_{0.33})O_2]$, Example 5: $0.5[Li_2Mn_{0.875}V_{0.125}O_3]\text{-}0.5[Li(Ni_{0.33}Co_{0.33}Mn_{0.33})O_2]$, and Example 6: $0.5[Li_2Mn_{0.9375}La_{0.0625}O_3]\text{-}0.5[Li(Ni_{0.33}Co_{0.33}Mn_{0.33})O_2]$, as positive active materials, is doped by a metal, and it is described that after the lithium batteries using the positive active materials of Examples 2, 3, and 6 were charged until their voltages reached 4.7 V in the formation process, the charge-discharge cycle was performed to obtain the discharge voltage drop, so that the discharge voltage drop was suppressed (paragraphs [0104] to [0125], [0137] to [0140], and [0168] to [0174]).

Patent Document 3 describes "A positive active material for a lithium secondary battery containing a lithium transition metal composite oxide represented by a composition formula $Li_{1+\alpha}Me_{1-\alpha}O_2$ (Me is a transition metal element including Co, Ni and Mn, and 1.2≤(1+$\alpha$)/(1-$\alpha$)≤1.4), wherein in the lithium transition metal composite oxide, a molar ratio Co/Me of Co in the Me is 0.20 to 0.36, and a half-value width for a diffraction peak attributed to a (104) plane is in a range of 0.262° to 0.424° when a space group R3-m is used for a crystal structure model based on an X-ray diffraction pattern." (claim 1).

It is further described that "in order to improve the energy density of the lithium secondary battery, the molar ratio Co/Me of Co to the transition metal element Me is 0.20 to 0.36. In order to increase the energy density and improve the high rate discharge performance, the molar ratio Co/Me is preferably 0.24 to 0.36, and the molar ratio Co/Me is more preferably 0.24 to 0.30." (paragraph [0014]).

Patent Document 4 describes "A positive active material for a lithium ion secondary battery, comprising a layered solid solution compound represented by $Li_{1+\alpha}Co_xNi_yMn_zM_wO_2$ (wherein M is at least one element selected from the group consisting of V, Mo, Ti, Al, Mg, and Fe, $0.05 \leq a \leq 0.25$, $0 \leq x \leq 0.15$, $0.1 \leq y \leq 0.5$, $0.2 \leq x+y \leq 0.5$, $0.3 \leq z \leq 0.6$, and $0 \leq w \leq 0.1$), wherein an amount of lithium contained as lithium carbonate in a total amount of lithium detected from a surface of the layered solid solution compound by X-ray photoelectron spectroscopy analysis is 2% or more and 20% or less in terms of atomic ratio, a half-value width of an X-ray diffraction peak at $2\theta=44.4\pm1°$ measured by powder X-ray diffraction with CuKα is 0.18° or more and 0.22° or less, and a BET specific surface area is 2.0 m$^2$/g or more." (claim 1) and a method of producing the positive active material, and further describes "the production method comprising performing primary heat treatment on a raw material mixed powder, containing a lithium-containing compound, a nickel-containing compound and a manganese-containing compound, and a compound containing a cobalt-containing compound and an element M that are optionally added (M is at least one element selected from the group consisting of V, Mo, Ti, Al, Mg, and Fe), at 300° C. or more and 750° C. or less, and performing secondary heat treatment at 900° C. or more and 1080° C. or less." (claim 3).

In addition, in Examples and Comparative Examples, it is described that for a lithium ion secondary battery having a composition of $Li_{1.2}Ni_{0.25}Mn_{0.55}O_2$, $Li_{1.2}Ni_{0.30}Mn_{0.50}O_2$, $Li_{1.28}Ni_{0.25}Mn_{0.55}O_2$, and $Li_{1.04}Ni_{0.30}Mn_{0.66}O_2$ as positive active materials, a charge-discharge test was performed, a discharge capacity was measured, and charge efficiency was calculated (paragraphs [0074] and [0075], Table 1).

Patent Document 5 describes "A positive active material for a nonaqueous electrolyte secondary battery, comprising a lithium transition metal composite oxide having an α-NaFeO$_2$-type crystal structure, wherein a molar ratio Li/Me of Li and a transition metal (Me) that form the lithium transition metal composite oxide is more than 1.2 and less than 1.5, the transition metal (Me) includes Mn and Ni, the lithium transition metal composite oxide has an X-ray diffraction pattern attributable to a space group P3$_1$12 or R3-m, a half-value width for a diffraction peak of a (003) plane at a Miller index hkl in X-ray diffraction measurement using a CuKα ray is 0.180 to 0.210°, and a BET specific surface area of the lithium transition metal composite oxide is 2.0 or more and 3.8 m$^2$/g or less." (claim 1) and "The positive active material for a nonaqueous electrolyte secondary battery, according to claim 1 or 2, wherein a ratio of a half-value width for the diffraction peak of the (003) plane to the half-value width for the diffraction peak of a (114) plane or a (104) plane at the Miller index hkl in the X-ray diffraction measurement using the CuKα ray of the lithium transition metal composite oxide is 0.731 or more." (claim 3).

In addition, in Examples and Comparative Examples, it is described that an initial charge-discharge test and a charge-discharge cycle test were performed on a nonaqueous electrolyte secondary battery having a composition of
$Li_{1.4}Ni_{0.199}Co_{0.119}Mn_{0.677}Nb_{0.005}O_{2+z}$,
$Li_{1.4}Ni_{0.198}Co_{0.119}Mn_{0.673}Nb_{0.010}O_{2+z}$,
$Li_{1.4}Ni_{0.197}Co_{0.118}Mn_{0.670}Nb_{0.015}O_{2+}$,
$Li_{1.4}Ni_{0.198}Co_{0.118}Mn_{0.667}Nb_{0.020}O_{2+z}$,
$Li_{1.4}Ni_{0.200}Co_{0.120}Mn_{0.680}Nb_{0.010}O_{2+z}$,
$Li_{1.4}Ni_{0.198}Co_{0.119}Mn_{0.673}Si_{0.010}O_{2+z}$, and
$Li_{1.4}Ni_{0.199}Co_{0.119}Mn_{0.677}Zr_{0.005}O_{2+z}$ as positive active materials, and the test results were recorded as an initial discharge capacity, initial efficiency, and a capacity retention ratio (paragraphs [0081] to [0083] and [0084], Table 1).

PRIOR ART DOCUMENTS

Patent Documents

Patent Document 1: JP-A-2016-143447
Patent Document 2: JP-A-2014-132572
Patent Document 3: JP-A-2014-044945
Patent Document 4: JP-A-2015-228353
Patent Document 5: JP-A-2016-219278

SUMMARY OF THE INVENTION

Problems to be Solved by the Invention

Since the "lithium-excess-type" active material can be regarded as a solid solution of LiMeO$_2$ and Li$_2$MnO$_3$ having a theoretical capacity larger than that of LiMeO$_2$, a large discharge capacity is expected to be obtained. However, there is a problem that the voltage of the battery decreases due to a change in the crystal structure associated with the charge-discharge cycle. Thus, conventionally, there has been adopted a method of lowering an upper limit voltage of charge or a method of suppressing a change in a crystal structure by adding a trace element to a positive active material.

Patent Document 1 describes that OCV measurement is performed at a low charge voltage of 4.45 V, but does not describe a battery that uses a lithium-excess-type active material having Li/Me of more than 1.24 and has a high OCV retention rate.

Although Patent Document 2 describes that the discharge voltage drop associated with the charge-discharge cycle is suppressed by addition (doping) of a trace element, it is essential to add a different element (Al, V, La, etc.) other than Ni and Mn to the positive active material, and only a positive active material containing Co in an amount similar to that of Ni is specifically described in addition to Ni and Mn. Therefore, an effect in a case where the positive active material does not contain a different element and the content of Co is small cannot be predicted from Patent Document 5.

In Patent Documents 3 to 5, the half-value width for the diffraction peak of the (104) plane of a "lithium-excess-type" positive active material falls within a specific range; however, it is not intended to suppress a decrease in discharge voltage associated with the charge-discharge cycle. Regarding the content of Co in the positive active material, Patent Document 3 describes that the molar ratio Co/Me is 0.20 to 0.36 in order to improve the energy density of the lithium secondary battery, and Patent Document 5 only specifically describes that the molar ratio Co/Me is 0.118 to 0.120. Patent Document 4 only specifically describes the positive active material having a molar ratio Li/Me of 1.5 or more or less than 1.1.

In view of the above, an object of the present invention is to provide a positive active material for a nonaqueous electrolyte secondary battery in which a decrease in potential associated with a charge-discharge cycle is suppressed, a positive electrode containing the positive active material, and a nonaqueous electrolyte secondary battery including the positive electrode.

Means for Solving the Problems

One aspect of the present invention is a positive active material for a nonaqueous electrolyte secondary battery containing a lithium transition metal composite oxide. In this positive active material, the lithium transition metal composite oxide has an α-NaFeO$_2$ structure, a molar ratio Li/Me of Li to a transition metal (Me) is 1.25≤Li/Me≤1.45, Ni and Mn are contained as the transition metal (Me), an X-ray diffraction pattern attributable to a space group R3-m is included, and a half-value width for a diffraction peak of a (104) plane at a Miller index hkl in X-ray diffraction measurement using a CuKα ray is 0.27° or less.

Another aspect of the present invention is a positive electrode for a nonaqueous electrolyte secondary battery containing the positive active material.

Still another aspect of the present invention is a nonaqueous electrolyte secondary battery including the positive electrode, a negative electrode, and a nonaqueous electrolyte.

Advantages of the Invention

According to the present invention, it is possible to provide a positive active material for a nonaqueous electrolyte secondary battery in which a decrease in potential associated with a charge-discharge cycle is suppressed, a positive electrode containing the active material, and a nonaqueous electrolyte secondary battery including the positive electrode.

MODE FOR CARRYING OUT THE INVENTION

Figure 1:
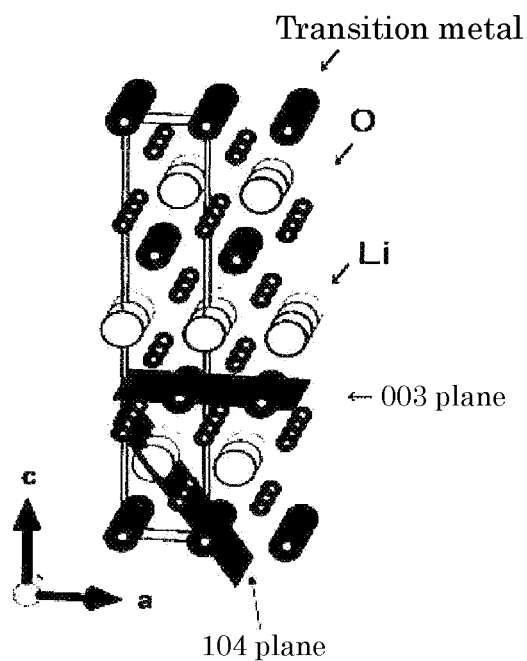
FIG. 1 is a LiMeO$_2$-type crystal structure diagram attributed to a space group R-3m (an explanatory diagram of a (104) plane and a (003) plane).

The configuration and operational effects of the present invention will be described together with the technical concept. However, the mechanism of action includes presumptions, and whether it is right or wrong does not limit the present invention. Incidentally, the present invention can be performed in other various forms without deviating from the spirit or main feature thereof. Accordingly, the embodiments and examples given below are merely examples in every way, and they should not be construed as restrictive. Further, variations and modifications falling under the scope equivalent to the claims are all within the scope of the present invention.

An embodiment of the present invention is a positive active material for a nonaqueous electrolyte secondary battery containing a lithium transition metal composite oxide. In this positive active material, the lithium transition metal composite oxide has an α-NaFeO$_2$ structure, a molar ratio Li/Me of Li to a transition metal (Me) is 1.25≤Li/Me≤1.45, Ni and Mn are contained as the transition metal (Me), an X-ray diffraction pattern attributable to a space group R3-m is included, and a half-value width for a diffraction peak of a (104) plane at a Miller index hkl in X-ray diffraction measurement using a CuKα ray is 0.27° or less.

According to an embodiment of the present invention, the molar ratio Li/Me is 1.25≤Li/Me≤1.45, and the half-value width for the diffraction peak of the (104) plane of the lithium transition metal composite oxide containing Ni and Mn is 0.27° or less, whereby a positive active material in which a decrease in potential associated with a charge-discharge cycle is suppressed can be obtained.

In an embodiment of the present invention, the lithium transition metal composite oxide may have a molar ratio Li/Me of 1.3 or more, or 1.4 or less.

In the lithium transition metal composite oxide, a molar ratio Ni/Me of Ni to Me may be 0.2 or more, particularly 0.25 or more, or less than 0.5, particularly 0.4 or less.

In the lithium transition metal composite oxide, a molar ratio Mn/Me of Mn to Me may be more than 0.5, particularly 0.6 or more, or 0.8 or less, particularly 0.75 or less.

As the transition metal (Me), Co having a molar ratio Co/Me of less than 0.05 may be contained. In this case, the molar ratio Co/Me may be 0.03 or less, 0.01 or less, or 0.

The half-value width for the diffraction peak of the (104) plane is preferably 0.21° or more.

In the lithium transition metal composite oxide having a molar ratio Li/Me of 1.25≤Li/Me≤1.45 and containing Ni and Mn, when the half-value width for the diffraction peak of the (104) plane is 0.21° to 0.27°, a positive active material having a high potential retention rate can be obtained.

An aluminum compound may be present on at least a part of a surface of the lithium transition metal composite oxide.

Another embodiment of the present invention is a positive electrode for a nonaqueous electrolyte secondary battery containing the positive active material.

Still another embodiment of the present invention is a nonaqueous electrolyte secondary battery including the positive electrode, a negative electrode, and a nonaqueous electrolyte.

The positive active material for a nonaqueous electrolyte secondary battery according to an embodiment of the present invention (hereinafter, referred to as the "positive active material according to the present embodiment") described above, the positive electrode for a nonaqueous electrolyte secondary battery according to another embodiment of the present invention (hereinafter, referred to as the "positive electrode for a nonaqueous electrolyte secondary battery according to the present embodiment"), and the nonaqueous electrolyte secondary battery according to still another embodiment of the present invention (hereinafter, referred to as the "nonaqueous electrolyte secondary battery according to the present embodiment") will be described in detail below.

(Lithium Transition Metal Composite Oxide)

The lithium transition metal composite oxide (hereinafter, referred to as the "lithium transition metal composite oxide according to the present embodiment") contained in the positive active material according to the present embodiment is typically a "lithium-excess-type" active material represented by a composition formula $Li_{1+\alpha}Me_{1-\alpha}O_2$ ($\alpha$>0, Me: transition metal containing Ni and Mn). In order to obtain a nonaqueous electrolyte secondary battery having a high energy density, the molar ratio Li/Me of Li to the transition metal (Me), that is, $(1+\alpha)/(1-\alpha)$ is 1.25 or more and 1.45 or less. The molar ratio Li/Me is preferably 1.3 or more. The molar ratio Li/Me is preferably 1.4 or less.

Since Ni has an action of improving the discharge capacity of the active material, the molar ratio Ni/Me of Ni to the transition metal element (Me) is preferably 0.2 or more, more preferably 0.25 or more, and particularly preferably 0.3 or more. The molar ratio Ni/Me is preferably less than 0.5, more preferably 0.45 or less, and particularly preferably 0.4 or less.

The molar ratio Mn/Me of Mn to the transition metal element Me is preferably more than 0.5, more preferably 0.6 or more, and particularly preferably 0.65 or more from the viewpoint of material cost and in order to improve charge-discharge cycle performance. The molar ratio Mn/Me is preferably 0.8 or less, more preferably 0.75 or less, and particularly preferably 0.7 or less.

Although Co has an action of enhancing electron conductivity of active material particles and improving high rate discharge performance, Co is an optional element that is preferably smaller in terms of charge-discharge cycle performance and economic efficiency. The molar ratio Co/Me of Co to the transition metal (Me) is preferably less than 0.05, and may be 0.03 or less, 0.01 or less, or 0. When a raw material containing Ni is used, Co may be contained as an impurity.

The lithium transition metal composite oxide according to the present embodiment may contain a small amount of other metals such as alkali metals such as Na and K, alkaline earth metals such as Mg and Ca, and transition metals typified by 3d transition metals such as Fe as long as the characteristics of the lithium transition metal composite oxide are not significantly impaired.

Particles of the lithium transition metal composite oxide according to the present embodiment preferably have a BET specific surface area of 8 $m^2/g$ or less.

The BET specific surface area is measured under the following conditions. Using the positive active material particles as a measurement sample, an adsorbed amount ($m^2$) of nitrogen on the measurement sample is determined by one point method using a specific surface area measurement apparatus manufactured by YUASA IONICS Co., Ltd. (trade name: MONOSORB). An amount of the measurement sample loaded is 0.5 g±0.01 g. Preheating is performed at 120° C. for 15 minutes. Cooling is performed using liquid nitrogen, and a nitrogen gas adsorption amount in a cooling process is measured. A value obtained by dividing the measured adsorption amount ($m^2$) by an active material mass (g) is taken as the BET specific surface area ($m^2/g$).

The lithium transition metal composite oxide can be obtained by mixing a compound containing a transition metal element and a lithium compound and firing the mixture. In the X-ray diffraction measurement using the CuKα ray, a powder after synthesis (before charge and discharge) has an α-$NaFeO_2$ type crystal structure, in addition to diffraction peaks at 2θ=18.6±1°, 36.7±1°, and 44.0±1° derived from a crystal system attributed to the space group R3-m, a superlattice peak (peak found in a monoclinic crystal of $Li_2MnO_3$ type) derived from a crystal system attributed to a space group C2/m, C2/c, or $P3_112$ is confirmed at 2θ=20.8±1°. However, when charge in which a region where a potential change is relatively flat with respect to an amount of charge appears is performed at least once in a positive electrode potential range of 4.5 V (vs. Li/$Li^+$) or more, symmetry of crystal changes with desorption of Li in the crystal, so that this superlattice peak disappears. The space group C2/m, C2/c, or $P3_112$ is a crystal structure model in which atom positions at 3a, 3b and 6c sites in the space group R3-m are subdivided.

The diffraction peaks at 2θ=18.6±1°, 36.7±1°, and 44.0±1° on the diagram of the X-ray diffraction pattern attributed to the space group R3-m are indexed to the (003) plane, the (101) plane, and the (104) plane at the Miller index hkl, respectively. The (104) plane of the $LiMeO_2$-type crystal structure attributed to the space group R-3m is a plane containing transition metal, lithium, and an oxygen site, as shown in FIG. 1. Incidentally, "R3-m" should otherwise be denoted by affixing a bar "-" above "3" of "R3m".

<X-Ray Diffraction Measurement>

In the present specification, X-ray diffraction measurement is performed under the following conditions. A ray source is CuKα, an acceleration voltage is 30 kV, and an acceleration current is 15 mA. A sampling width is 0.01 deg, a scanning speed is 1.0 deg/min, a divergence slit width is 0.625 deg, a light receiving slit is open, and a scattering slit width is 8.0 mm.

<Method of Preparing Sample to be Subjected to X-Ray Diffraction Measurement>

A sample to be subjected to the X-ray diffraction measurement for the positive active material according to the present embodiment and the active material contained in the positive electrode included in the nonaqueous electrolyte secondary battery according to the present embodiment is prepared according to the following procedure and conditions.

The sample to be subjected to the measurement is subjected to the measurement as it is if the sample is an active material powder before preparation of the positive electrode. When a sample is collected from a positive electrode taken out from a disassembled battery, before the battery is disassembled, constant current discharge is performed up to a battery voltage, which is the lower limit of a designated voltage, at a current value (A) that is 1/10 of a nominal capacity (Ah) of the battery, and the battery is brought to a discharge state. As a result of disassembly, if the battery uses a metal lithium electrode as the negative electrode, the additional operation described below is not performed, and a positive composite collected from the positive electrode is to be measured. If the battery does not use a metal lithium electrode as the negative electrode, in order to accurately control a positive electrode potential, after the battery is disassembled to take out the electrode, a battery using a metal lithium electrode as the counter electrode is assembled. Constant current discharge is performed at a current value of 10 mA per 1 g of the positive composite until the potential of the positive electrode becomes 2.0 V (vs. Li/$Li^+$), and the battery is adjusted to the discharge state and then disassembled again. In the taken out positive electrode plate, a nonaqueous electrolyte attached is sufficiently washed using dimethyl carbonate, and the positive electrode is dried at room temperature for 24 hours. Then, the composite on an aluminum foil current collector is collected. The collected composite is lightly loosened in an agate mortar, placed in a sample holder for X-ray diffraction measurement, and subjected to measurement. The operations from the disassembly to re-disassembly of the battery, and the washing and drying operations of the positive electrode plate are performed in an argon atmosphere having a dew point of −60° C. or lower.

In the lithium transition metal composite oxide contained in the positive active material according to the present embodiment, the half-value width (hereinafter, also referred to as "FWHM (104)") of the diffraction peak indexed to the (104) plane is 0.27° or less. When the FWHM (104) is 0.27° or less, it is possible to obtain a nonaqueous electrolyte secondary battery in which the decrease in potential associated with the charge-discharge cycle is suppressed. The FWHM (104) may be 0.265° or less, or 0.26° or less.

It is presumed that the technical meaning of specifying the FWHM (104) of the lithium transition metal composite oxide is due to the following mechanism of action based on FIGS. 2 to 4 obtained by graphing data obtained from Examples and Comparative Examples described later.

FIG. 1 shows the $LiMeO_2$-type crystal structure attributed to the space group R-3m. The (003) plane is a plane containing only a transition metal site, and the (104) plane is a plane containing the transition metal site, a lithium site, and an oxygen site.

In general, the half-value width for the diffraction peak shows that the smaller the half-value width, the larger the crystallite diameter and/or the smaller crystal distortion, and that the larger the half-value width, the smaller the crystallite diameter and/or the larger the crystal distortion.

Figure 2:
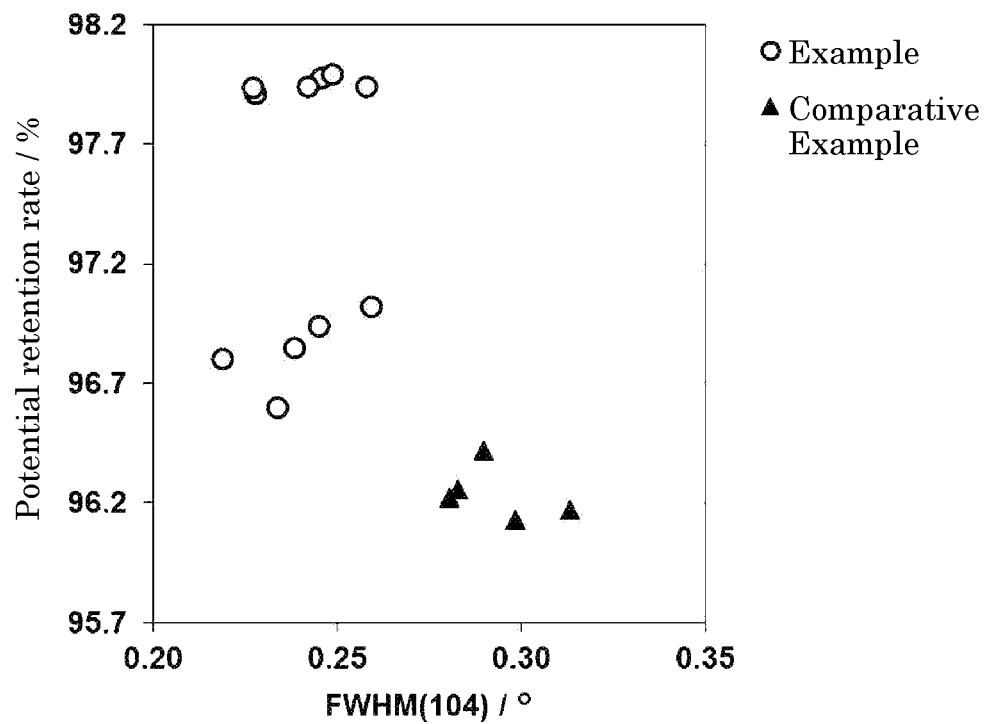
FIG. 2 is a graph showing a relationship between a half-value width of the (104) plane of a "lithium-excess-type" active material and a potential retention rate.

FIG. 2 shows a relationship between the FWHM (104) of the lithium transition metal composite oxide contained in the positive active material according to the present embodiment and the potential retention rate after the charge-discharge cycle of the nonaqueous electrolyte secondary battery using the positive active material. As shown in FIG. 2, the FWHM (104) has a correlation with the potential retention rate, and the potential retention rate can be increased at 0.27° or less. The FWHM (104) is a value related to the crystallite diameter in a perpendicular direction of the (104) plane and the distortion of the crystal in a direction perpendicular to the (104) plane.

Figure 4:
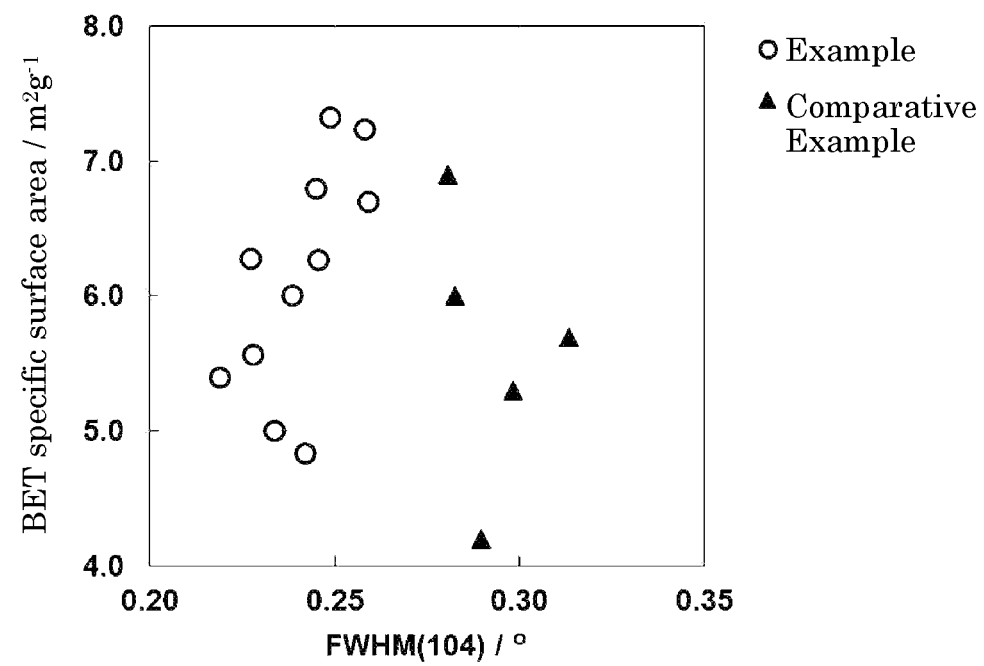
FIG. 4 is a graph showing a relationship between the half-value width of the (104) plane of the "lithium-excess-type" active material and a BET specific surface area.

In addition, when a relationship between the FWHM (104) of the lithium transition metal composite oxide and a BET specific surface area of the active material was confirmed, as shown in FIG. 4, there was no correlation between the FWHM (104) and the BET specific surface area. Here, it is known that the size of the crystallite diameter is correlated with the BET specific surface area of the active material. Therefore, it is determined that the FWHM (104) represents not the size of the crystallite diameter but the crystal distortion of the (104) plane.

Figure 3:
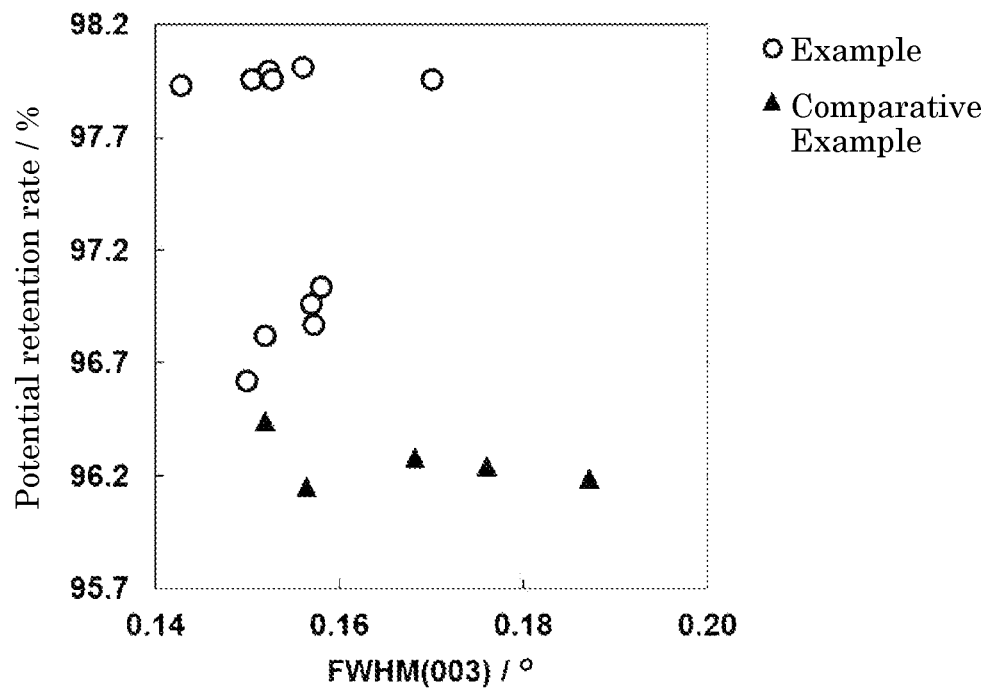
FIG. 3 is a graph showing a relationship between a half-value width of the (003) plane of the "lithium-excess-type" active material and the potential retention rate.

On the other hand, FIG. 3 shows a relationship between the half-value width (hereinafter, referred to as the "FWHM (003)") for the diffraction peak indexed to the (003) plane of the lithium transition metal composite oxide contained in the positive active material according to the present embodiment and the potential retention rate after the charge-discharge cycle of the nonaqueous electrolyte secondary battery using the positive active material. As shown in FIG. 3, there is no correlation between the FWHM (003) and the potential retention rate.

According to the above, the potential retention rate is considered to be related to the crystal distortion in a direction perpendicular to the (104) plane.

The fact that the value of the FWHM (104) of the lithium transition metal composite oxide is small and the crystal distortion is small indicates that alignment of the transition metal and lithium is regularly maintained, and cation mixing in which the transition metal is randomly replaced by lithium sites hardly occurs. Therefore, it is presumed that when the lithium transition metal composite oxide in which the FWHM (104) is 0.27° or less is used for the positive active material, a structural change associated with charge-discharge hardly occurs, and therefore, a decrease in potential associated with a charge-discharge cycle is suppressed, so that a nonaqueous electrolyte secondary battery exhibiting a high potential retention rate is obtained. However, when the FWHM (104) decreases, the potential retention rate tends not to be excellent, and thus the FWHM (104) is preferably 0.21° or more and more preferably more than 0.22° in order to make an effect of suppressing the potential decrease excellent.

From Examples and Comparative Examples described later, it has been found that the positive active material containing the lithium transition metal composite oxide in which the FWHM (104) is 0.27° or less, and in addition, the half-value width (hereinafter, referred to as "FWHM (101)") for the diffraction peak of the (101) plane is 0.22° or less has a high potential retention rate, a high initial coulombic efficiency (hereinafter, referred to as "initial efficiency"), which is a ratio of a discharge capacity to an initial charge capacity, and a large discharge capacity.

Since the FWHM (101) includes information on the degree of crystal growth in a direction perpendicular to the (101) plane and a variation (hereinafter, also referred to as "distortion of the (101) plane") in a lattice spacing of the (101) plane, the small FWHM (101) means that the crystal growth in the direction perpendicular to the (101) plane is progressing (crystallite diameter is large) or the distortion of the (101) plane is small. The (101) plane of the $LiMeO_2$-type crystal structure attributed to the space group R-3m is a plane obliquely crossing the transition metal atom of each transition metal layer, and it is considered that when the crystallite diameter is large, a lithium ion diffusion distance in the crystal becomes long, so that the separation/insertion of lithium ions is inhibited and the discharge capacity decreases. However, according to Examples and Comparative Examples described later, the discharge capacity is rather improved.

Therefore, it is presumed that the fact that the FWHM (101) is small and the crystal distortion of the (101) plane is small contributes to the ease of the separation/insertion of lithium ions, and the reason is that a "lithium-excess-type" active material having high initial efficiency and a large discharge capacity is obtained. The FWHM (101) may be 0.215° or less, or 0.21° or less.

The FWHM (003) of the lithium transition metal composite oxide according to the present embodiment is preferably 0.175° or less.

The FWHM (003) includes information on a degree of crystal growth in a direction perpendicular to the (003) plane and a variation (hereinafter, also referred to as "distortion of the (003) plane") in a lattice spacing of the (003) plane. Hereinafter, consideration will be given from the viewpoint of the distortion of the (003) plane.

When distortion occurs and the lattice spacing is locally narrow (in Bragg's reflection formula; $2d \sin \theta = n\lambda$, d is small), a peak is observed on a slightly high angle side in the X-ray diffraction diagram, and when the lattice spacing is locally wide (in the Bragg's reflection formula, d is large), a peak is observed on a slightly low angle side in the X-ray diffraction diagram. That is, it is considered that the fact that the FWHM (003) is not too large means that the lattice spacing of the (003) plane is nearly uniform to some extent (distortion in the crystal is small), and there is little hindrance to lithium ions extracted/inserted along the ab plane.

Next, attention was paid to a ratio (hereinafter, referred to as "FWHM (101)/FWHM (003)") of the FWHM (101) to the FWHM (003). As shown in Examples described later, it was found that when FWHM (101)/FWHM (003) was 1.40 or less, a large discharge capacity and excellent initial efficiency were obtained. The mechanism of action is presumed as follows.

As described above, it is preferable that the FWHM (003) is not too large. However, if the FWHM (003) is too small, it is considered that efficiency of separation/insertion of lithium ions decreases, and the initial efficiency and the discharge capacity decrease.

Therefore, the fact that FWHM (101)/FWHM (003) is equal to or less than a fixed value means that the FWHM (003) is in a suitable range, that is, the distortion of the (003) plane is suitable, and the FWHM (101) is small, that is, the distortion of the (101) plane is small; therefore, it is inferred that the initial efficiency and the discharge capacity can be increased. FWHM (101)/FWHM (003) may be 1.35 or less, or 1.30 or less.

(Method of Producing Precursor)

The lithium transition metal composite oxide contained in the positive active material according to the present embodiment can be produced using a precursor obtained by supplying a solution containing Ni and Mn and an alkali solution to a reaction tank and precipitating a transition metal compound containing Ni and Mn while stirring the inside of the reaction tank.

The precursor can be prepared by supplying a solution containing a transition metal at a predetermined concentration and the alkali solution to the reaction tank equipped with a stirrer, filtering an overflowed suspension, washing an obtained precipitate with water, and drying the precipitate. The overflowed suspension may be continuously concentrated in a concentration tank and returned to the reaction tank.

It is preferable that the solution containing the transition metal is prepared by weighing and mixing a transition metal compound so as to have a desired composition of the lithium transition metal composite oxide.

A nickel source used in the solution containing the transition metal is not particularly limited, and examples thereof include nickel sulfate, nickel oxide, nickel hydroxide, nickel nitrate, nickel carbonate, nickel chloride, nickel iodide, and metal nickel, and nickel sulfate is preferable.

Similarly, a cobalt source is not particularly limited, and examples thereof include cobalt sulfate, cobalt oxide, cobalt hydroxide, cobalt nitrate, cobalt carbonate, cobalt chloride, cobalt iodide, and metal cobalt, and cobalt sulfate is preferable.

Similarly, a manganese source is not particularly limited, and examples thereof include manganese sulfate, manganese oxide, manganese hydroxide, manganese nitrate, manganese carbonate, manganese chloride, manganese iodide, and metallic manganese, and manganese sulfate is preferable.

A rotation speed of the stirrer depends on a scale of the reaction tank, but is preferably adjusted to 200 to 1000 rpm, for example, in a reaction tank containing about 30 L of a reaction liquid in Examples described later. By selecting a suitable range of stirring speeds, the concentration of the transition metal for each particle of the precursor is made uniform. When the concentration of the transition metal (Me: Ni and Mn) for each particle of the precursor is made uniform, domains of a $LiMeO_2$ phase and a $Li_2MnO_3$ phase of the "lithium-excess-type" active material obtained from the precursor become small, and the distortion of the entire crystal becomes small. In particular, the FWHM (104) can be reduced. It is presumed that when the domain becomes small, $Li_2MnO_3$ is easily activated, and the crystal distortion is also small, so that the effect of suppressing the potential decrease associated with the charge-discharge cycle is exhibited.

When the stirring speed is too slow, the concentration of the transition metal for each particle of the precursor tends to be non-uniform, and when the stirring speed is too fast, a fine powder is generated, so that handling of the powder tends to be difficult.

The rotation speed is more preferably 250 to 700 rpm. The rotation speed is still more preferably 300 to 600 rpm.

The temperature in the reaction tank is preferably adjusted to 20 to 60° C. By selecting a suitable range of temperatures and controlling solubility to a suitable value, the concentration of the transition metal can be easily made uniform. As the concentration of the transition metal becomes uniform, the domains of the $LiMeO_2$ phase and the $Li_2MnO_3$ phase of the "lithium-excess-type" active material obtained from the precursor become small, and it is presumed that the same effect as described above is exhibited.

When the temperature in the reaction tank is too low, the solubility decreases, a deposition rate increases, the concentration of the transition metal tends to be non-uniform, and the distortion of the entire crystal increases. If the temperature is too high, while the solubility increases, the deposition rate decreases, and a reaction time increases, which is not practically preferable. A more preferable temperature is 30° C. to 60° C. A still more preferable temperature is 35° C. to 55° C.

The precursor can be a transition metal carbonate precursor using, as a carbonate aqueous solution, an alkali aqueous solution supplied to the reaction tank together with an aqueous solution of a transition metal compound.

The carbonate aqueous solution is preferably a sodium carbonate aqueous solution, a potassium carbonate aqueous solution, a lithium carbonate aqueous solution, or the like.

A preferable pH of the reaction tank at the time of producing the precursor is 10 or less, and more preferably 7 to 9. The lower the pH, the higher the solubility of Ni and Mn, so that the composition of Ni and Mn of the precursor tends to be uniform.

Therefore, the domains of the $LiMeO_2$ phase and the $Li_2MnO_3$ phase of the "lithium-excess-type" active material obtained from the precursor become small, and the distortion of the entire crystal becomes small; therefore, it is presumed that the same effect as described above is exhibited.

In an ordinary precursor preparation step, a complexing agent such as ammonia or an ammonium salt is often poured into the reaction tank together with an aqueous alkali solution. However, when the complexing agent is poured, Ni easily forms a complex, so that there is an extreme difference in solubility between Ni and Mn, and there is a possibility that the composition of Ni and Mn of the precursor is difficult to be uniform. Therefore, no complexing agent is used in Examples described later.

(Method of Producing Positive Active Material)

The lithium transition metal composite oxide contained in the positive active material according to the present embodiment can be produced by mixing the precursor produced by the above method with a lithium compound and firing the mixture.

The firing temperature is preferably 840° C. or more and 1000° C. or less. When the firing temperature is 840° C. or more, a desired crystal is obtained. When the firing temperature is 1000° C. or less, excessive crystal growth can be suppressed, and a large energy density can be obtained. The firing temperature is more preferably 850° C. to 970° C.

The mixing treatment of the lithium compound and a particle powder of the precursor may be performed by either a dry method or a wet method as long as these materials can be uniformly mixed with each other.

When the precursor used in this embodiment is a carbonate, it is preferable to perform sufficient ventilation during firing so that the carbonate is decomposed and does not remain.

The lithium compound used in this embodiment is not particularly limited, and various lithium compounds can be used. Examples thereof include lithium hydroxide monohydrate, lithium nitrate, lithium carbonate, lithium acetate, lithium bromide, lithium chloride, lithium citrate, lithium fluoride, lithium iodide, lithium lactate, lithium oxalate, lithium phosphate, lithium pyruvate, lithium sulfate, and lithium oxide, and lithium carbonate is preferable.

The lithium transition metal composite oxide obtained by firing is preferably a powder having an average secondary particle size of 100 μm or less, and particularly preferably a powder having an average secondary particle size of 15 μm or less for the purpose of improving high power characteristics of a nonaqueous electrolyte battery. For obtaining a powder of a predetermined particle size, a method of preparing a precursor of a predetermined size, a method using a pulverizer, a classifier, or the like, and other methods can be adopted. As a pulverizer, for example, a mortar, a ball mill, a sand mill, a vibratory ball mill, a planetary ball mill, a jet mill, a counter jet mill, a whirling airflow type jet mill, a sieve or the like is used. At the time of pulverization, wet type pulverization in the presence of water or an organic solvent such as hexane can be also employed. A classification method is not particularly limited. A sieve or an air classifying apparatus may be employed based on the necessity for powders subjected to pulverization both in dry manner and in wet manner.

The surfaces of the primary particles and/or secondary particles of the lithium transition metal composite oxide obtained by firing may be coated with an aluminum compound and/or dissolved. Due to the presence of the aluminum compound on a particle surface, a direct contact between the lithium transition metal composite oxide and the nonaqueous electrolyte is prevented, deterioration associated with a structural change of the active material and the like can be suppressed, and an energy density retention rate can be improved.

In order to coat with the aluminum compound, a method can be adopted in which lithium transition metal composite oxide particles are deflocculated in pure water, the aluminum compound is added dropwise with stirring, the mixture is then filtered and washed with water, and dried at about 80° C. to 120° C., and the resultant is fired in an electric furnace at about 300° C. to 500° C. for about 5 hours under air circulation.

The aluminum compound can be dissolved by appropriately adjusting conditions such as a drying temperature and a firing temperature when the aluminum compound is coated.

The aluminum compound is not particularly limited, and examples thereof include aluminum sulfate, aluminum oxide, aluminum hydroxide, aluminum nitrate, aluminum carbonate, aluminum chloride, aluminum iodide, sodium aluminate, and metallic aluminum, and aluminum sulfate is preferable.

When a surface of the lithium transition metal composite oxide particles is coated with the aluminum compound, the aluminum compound is preferably 0.1 wt % to 0.7 wt %, and more preferably 0.2 wt % to 0.6 wt % with respect to the lithium transition metal composite oxide, so that the effect of further improving the energy density retention rate is more sufficiently exhibited.

(Positive Electrode)

A composite obtained by mixing the positive active material according to the present embodiment with a material such as a conductive agent, a binder, a thickener, or a filler as another optional component is applied to a current collector or pressure-bonded to the current collector, whereby the positive electrode for a nonaqueous electrolyte secondary battery according to the present embodiment can be produced.

The conductive agent is not limited as long as it is an electron conductive material which does not cause an adverse effect on the battery characteristics. Usually, one or a mixture of conductive materials such as natural graphite (scaly graphite, flaky graphite, earthy graphite, and the like), artificial graphite, carbon black, acetylene black, ketjen black, carbon whisker, carbon fibers, metal (copper, nickel, aluminum, silver, gold, and the like) powder, metal fibers, and conductive ceramic materials can be contained as the conductive agent.

Among these, acetylene black is preferable as the conductive agent from the viewpoints of electron conductivity and coatability. The amount of the conductive agent to be added is preferably 0.1% by weight to 50% by weight and particularly preferably 0.5% by weight to 30% by weight based on a total weight of the positive electrode. Especially, use of acetylene black after pulverized into ultrafine particles with a diameter of 0.1 to 0.5 μm is preferable since the amount of carbon to be needed can be lessened. In order to sufficiently mix the conductive agent with the positive active material, a powder mixing apparatus such as a V-type mixing apparatus, an S-type mixing apparatus, an attriter, a ball mill, or a planetary ball mill can be used in a dry manner or a wet manner.

As the binder, usually, thermoplastic resins such as polytetrafluoroethylene (PTFE), polyvinylidene fluoride (PVdF), polyethylene and polypropylene, and polymers having rubber elasticity, such as ethylene-propylene-diene terpolymers (EPDM), sulfonated EPDM, styrene butadiene rubber (SBR) and fluororubber can be used alone or as a mixture of two or more thereof. The amount of the binder to be added is preferably 1 to 50% by weight and particularly preferably 2 to 30% by weight based on the total weight of the positive electrode.

The filler is not limited as long as it is a material that does not adversely affect the battery performance. Usually, olefin polymers such as polypropylene and polyethylene, amorphous silica, alumina, zeolites, glass, carbon, and the like are used. The amount of the filler to be added is preferably 30% by weight or less based on the total weight of the positive electrode.

The positive electrode is preferably produced by mixing a composite, obtained by kneading the positive active material and the above-described optional material, with an organic solvent, such as N-methylpyrrolidone or toluene, or water, thereafter, applying or pressure-bonding the obtained mixture solution onto a current collector such as an aluminum foil, and carrying out heat treatment at a temperature of about 50° C. to 250° C. for about 2 hours. With respect to the above-described application method, it is preferable, for example, to carry out application in an arbitrary thickness and an arbitrary shape by using a technique such as roller coating with an applicator roller, screen coating, doctor blade coating, spin coating, or a bar coater; however the method is not limited to these examples.

(Nonaqueous Electrolyte Secondary Battery)

The nonaqueous electrolyte secondary battery according to the present embodiment includes the positive electrode, the negative electrode, and the nonaqueous electrolyte. Hereinafter, each element of the nonaqueous electrolyte secondary battery will be described in detail.

(Negative Electrode)

A negative electrode material of the battery according to the present embodiment is not limited, and any negative electrode material may be selected as long as it can release or store lithium ions. Examples thereof include lithium composite oxides such as lithium titanate having a spinel crystal structure typified by $Li[Li_{1/3}Ti_{5/3}]O_4$, metal lithium, lithium alloys (metal lithium-containing alloys such as lithium-silicon, lithium-aluminum, lithium-lead, lithium-tin, lithium-aluminum-tin, lithium-gallium, and wood's alloy), lithium oxides such as silicon oxide, and alloys and carbon materials (e.g. graphite, hard carbon, lower temperature calcined carbon, amorphous carbon) capable of absorbing and releasing lithium.

The negative electrode can be formed by applying or pressure-bonding a composite, obtained by mixing a powder of the negative active material with the above-described materials such as a conductive agent, a binder, a thickener, and a filler, which are optional components similar to those of the positive electrode, onto a current collector such as a copper foil or a nickel foil.

(Nonaqueous Electrolyte)

The nonaqueous electrolyte used for a nonaqueous electrolyte secondary battery according to the present embodiment is not limited, and those that are generally proposed to be used in lithium batteries and the like can be used.

Examples of a nonaqueous solvent to be used for the nonaqueous electrolyte include cyclic carbonic acid esters such as propylene carbonate, ethylene carbonate, fluoroethylene carbonate, butylene carbonate, chloroethylene carbonate, and vinylene carbonate; cyclic esters such as γ-butyrolactone, and γ-valerolactone; chain carbonates such as dimethyl carbonate, diethyl carbonate, ethyl methyl carbonate, and trifluoroethyl methyl carbonate; chain esters such as methyl formate, methyl acetate, and methyl butyrate; tetrahydrofuran and derivatives thereof; ethers such as 1,3-dioxane, 1,4-dioxane, 1,2-dimethoxyethane, 1,4-dibutoxyethane, and methyl diglyme; nitriles such as acetonitrile, and benzonitrile; dioxolane and derivatives thereof; ethylene sulfide, sulfolane, sultone and derivatives thereof, and these compounds may be used alone or two or more of them may be used in the form of a mixture; however, the nonaqueous solvent is not limited to these examples.

Examples of an electrolyte salt to be used for the nonaqueous electrolyte include inorganic ion salts containing one of lithium (Li), sodium (Na), and potassium (K) such as $LiClO_4$, $LiBF_4$, $LiAsF_6$, $LiPF_6$, $LiSCN$, $LiBr$, $LiI$, $Li_2SO_4$, $Li_2B_{10}Cl_{10}$, $NaClO_4$, $NaI$, $NaSCN$, $NaBr$, $KClO_4$, and $KSCN$ and organic ion salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearyl sulfonate, lithium octylsulfonate, and lithium dodecylbenzenesulfonate, and these ionic compounds may be used alone or two or more of them may be used in the form of a mixture.

Further, use of $LiPF_6$ or $LiBF_4$ and a lithium salt having a perfluoroalkyl group such as $LiN(C_2F_5SO_2)_2$ in the form of a mixture can further lower the viscosity of the electrolyte. Therefore, the low temperature characteristics can be further improved, and self discharge can be suppressed. Consequently, use of such a mixture is more desirable.

A room temperature molten salt or an ionic liquid may be used as the nonaqueous electrolyte.

The concentration of the electrolyte salt in the nonaqueous electrolyte is preferably 0.1 mol/L to 5 mol/L and more preferably 0.5 mol/L to 2.5 mol/L in order to obtain a nonaqueous electrolyte secondary battery having high characteristics.

(Separator)

As a separator, porous membranes, nonwoven fabrics, and the like showing excellent high rate discharge performance are preferably used alone or in combination. Examples of a material constituting a separator for a nonaqueous electrolyte battery include polyolefin resins typified by polyethylene and polypropylene; polyester resins typified by poly(ethylene terephthalate) and poly(butylene terephthalate); poly(vinylidene fluoride), vinylidene fluoride-hexafluoropropylene copolymers, vinylidene fluoride-perfluorovinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers, and vinylidene fluoride-ethylene-tetrafluoroethylene copolymers.

Porosity of the separator is preferably 98% by volume or less from the viewpoint of strength. The porosity is preferably 20% by volume or more from the viewpoint of charge-discharge characteristics.

Further, as the separator, a polymer gel comprised of, for example, acrylonitrile, ethylene oxide, propylene oxide, methyl methacrylate, vinyl acetate, vinylpyrrolidone, a polymer such as poly(vinylidene fluoride) with an electrolyte may be used. Use of the nonaqueous electrolyte in the gel state as described above is preferable in terms of an effect of preventing liquid leakage.

Further, use of the porous membranes or nonwoven fabrics as described above in combination with the polymer gel for the separator is preferable because of improvement of a liquid retention property of the electrolyte. That is, a film is formed by coating the surface and fine pore wall faces of a polyethylene finely porous membrane with a solvophilic polymer in a thickness of several μm or thinner, and the electrolyte is maintained in the fine pores of the film, and thus causing gelation of the solvophilic polymer.

Examples of the solvophilic polymer include, in addition to poly(vinylidene fluoride), polymers obtained by cross-linking acrylate monomers having ethylene oxide groups, ester groups, or the like, epoxy monomers, monomers having isocyanato groups, and the like. These monomers can be crosslinked by radiating electron beams (EB) or adding a radical initiator and heating or radiating ultraviolet (UV) rays.

(Other Components)

Other components of a battery includes a terminal, an insulating plate, a battery case and the like, and for these parts, heretofore used parts may be used as-is.

(Configuration of Nonaqueous Electrolyte Secondary Battery)

The configuration of the nonaqueous electrolyte secondary battery according to the present embodiment is not particularly limited, and examples include cylindrical batteries, prismatic batteries (rectangular batteries), and flat batteries having a positive electrode, a negative electrode and a roll-shaped separator.

Figure 5:
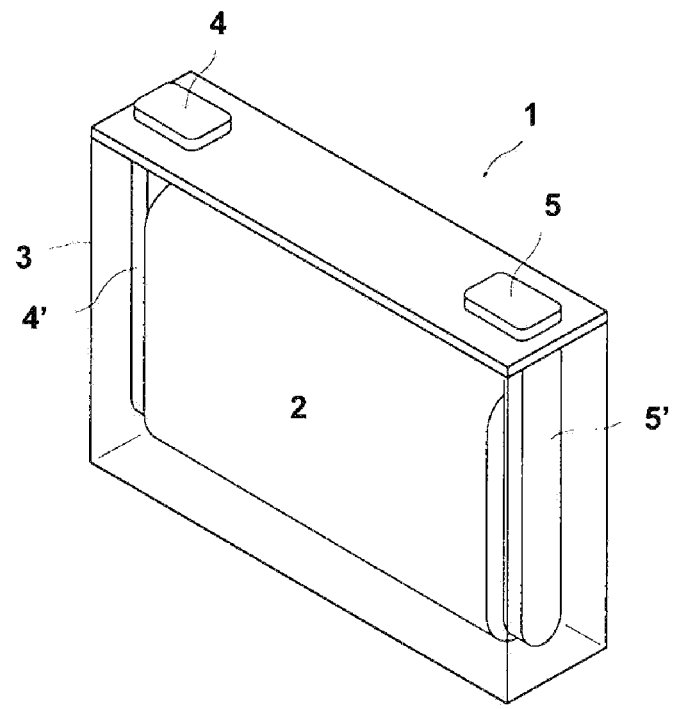
FIG. 5 is an external perspective view showing a nonaqueous electrolyte secondary battery according to an embodiment of the present invention.

FIG. 5 shows an external perspective view of a rectangular nonaqueous electrolyte secondary battery according to the present embodiment. FIG. 8 is a view showing an inside of a case in a perspective manner. In the nonaqueous electrolyte secondary battery 1 shown in FIG. 5, an electrode group 2 is housed in a battery case 3. The electrode group 2 is formed by winding a positive electrode, including a positive active material, and a negative electrode, including a negative active material, with a separator interposed between the electrodes. The positive electrode is electrically connected to a positive electrode terminal 4 through a positive electrode lead 4', and the negative electrode is electrically connected to a negative electrode terminal 5 through a negative electrode lead 5'.

(Configuration of Energy Storage Apparatus)

Figure 6:
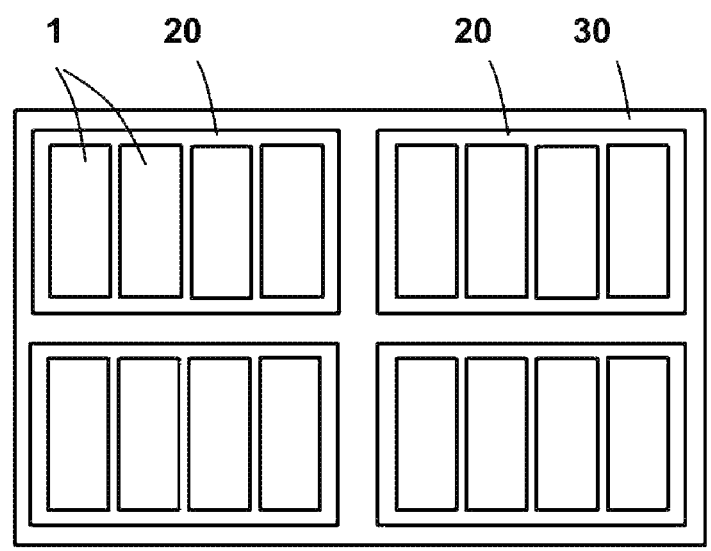
FIG. 6 is a conceptual diagram showing an energy storage apparatus including a plurality of the nonaqueous electrolyte secondary batteries according to the embodiment of the present invention.

The present embodiment includes an energy storage apparatus including a plurality of the nonaqueous electrolyte secondary batteries described above. An energy storage apparatus 30 shown in FIG. 6 includes a plurality of energy storage units 20. Each of the energy storage units 20 includes a plurality of the nonaqueous electrolyte secondary batteries 1. The energy storage apparatus 30 can be mounted as a power source for an automobile such as an electric vehicle (EV), a hybrid vehicle (HEV), a plug-in hybrid vehicle (PHEV), or the like.

EXAMPLES

In the following, the present invention will be described in detail with reference to representative Examples and Comparative Examples of the present invention. However, the present invention is not limited to these Examples.

Example 1

(Precursor Preparation Step)

Nickel sulfate and manganese sulfate were weighed so that a molar ratio of nickel and manganese was Ni:Mn=31.7:68.3, and then mixed with water to obtain a mixed solution. A 1.3 mol/L sodium carbonate aqueous solution was provided. 30 L of water was placed in a closed type reaction tank, and the temperature was maintained at 40° C. while carbon dioxide gas was circulated at 0.1 L/min. A sodium carbonate aqueous solution was added to adjust the pH to 8.5. The mixed solution and the sodium carbonate aqueous solution were continuously added dropwise to the reaction tank while being stirred at 400 rpm. After 48 hours, an overflowed suspension was collected, filtered, and washed with water. After washing with water, the resultant was dried at 120° C. overnight to obtain a powder of a coprecipitation precursor.

(Firing Step)

A lithium carbonate powder was weighed so that a ratio (molar ratio) of lithium to an amount of transition metal in the coprecipitation precursor was Li/(Ni+Mn)=1.38, and sufficiently mixed with the coprecipitation precursor. The resultant mixture was fired at 900° C. for 5 hours in an oxidizing atmosphere using an electric furnace to obtain a lithium transition metal composite oxide of Example 1.

Example 2

A lithium transition metal composite oxide of Example 2 was obtained in the same manner as in Example 1 except that in the precursor preparation step, nickel and manganese were weighed so that the molar ratio of nickel and manganese was Ni:Mn=31.8:68.2, and mixed with water, the temperature of the reaction tank was changed to 35° C., the stirring speed was changed to 600 rpm, and in the firing step, Li/(Ni+Mn) was changed to 1.37.

Example 3

A lithium transition metal composite oxide of Example 3 was obtained in the same manner as in Example 2 except that in the precursor preparation step, the stirring speed was changed to 700 rpm.

Example 4

A lithium transition metal composite oxide of Example 4 was obtained in the same manner as in Example 1 except that in the precursor preparation step, nickel and manganese were weighed so that the molar ratio of nickel and manganese was Ni:Mn=31.5:68.5, and mixed with water, the temperature of the reaction tank was changed to 45° C., and the stirring speed was changed to 500 rpm.

Example 5

A lithium transition metal composite oxide of Example 5 was obtained in the same manner as in Example 4 except that Li/(Ni+Mn) was changed to 1.39 in the firing step.

Example 6

A lithium transition metal composite oxide of Example 6 was obtained in the same manner as in Example 4 except that in the precursor preparation step, nickel and manganese were weighed so that the molar ratio of nickel and manganese was Ni:Mn=31.6:68.4, and mixed with water, the temperature of the reaction tank was changed to 20° C., the stirring speed was changed to 250 rpm, and in the firing step, Li/(Ni+Mn) was changed to 1.36.

Example 7

A lithium transition metal composite oxide of Example 7 was obtained in the same manner as in Example 4 except that Li/(Ni+Mn) was changed to 1.36 in the firing step.

Example 8

A lithium transition metal composite oxide of Example 8 was obtained in the same manner as in Example 7 except that in the precursor preparation step, the temperature of the reaction tank was changed to 30° C.

Example 9

A lithium transition metal composite oxide of Example 9 was obtained in the same manner as in Example 7 except that in the precursor preparation step, the temperature of the reaction tank was changed to 55° C., and the stirring speed was changed to 350 rpm.

Example 10

A lithium transition metal composite oxide of Example 10 was obtained in the same manner as in Example 7 except that in the precursor preparation step, the temperature of the reaction tank was changed to 50° C., and the stirring speed was changed to 200 rpm.

Example 11

A lithium transition metal composite oxide of Example 11 was obtained in the same manner as in Example 1 except that in the precursor preparation step, nickel sulfate, cobalt sulfate, and manganese sulfate were weighed so that a molar ratio of nickel, cobalt, and manganese was Ni:Co:Mn=32.8:0.2:67.0, and then mixed with water to obtain a mixed solution, the temperature of the reaction tank was changed to 60° C., the stirring speed was changed to 1000 rpm, and in the firing step, Li/(Ni+Co+Mn) was changed to 1.35.

Comparative Example 1

A lithium transition metal composite oxide of Comparative Example 1 was obtained in the same manner as in Example 2 except that in the precursor preparation step, nickel and manganese were weighed so that the molar ratio of nickel and manganese was Ni:Mn=31.4:68.6, and mixed with water, and the temperature of the reaction tank was changed to 15° C.

Comparative Example 2

A lithium transition metal composite oxide of Comparative Example 2 was obtained in the same manner as in Comparative Example 1 except that Li/(Ni+Mn) was changed to 1.39 in the firing step.

Comparative Example 3

A lithium transition metal composite oxide of Comparative Example 3 was obtained in the same manner as in Comparative Example 1 except that in the precursor preparation step, nickel, cobalt, and manganese were weighed so that the molar ratio of nickel, cobalt, and manganese was Ni:Co:Mn=34.7:0.8:64.5, and mixed with water, the stirring speed was changed to 100 rpm, and in the firing step, a ratio (molar ratio) of lithium to an amount of transition metal in the coprecipitation precursor was changed to Li/(Ni+Co+Mn)=1.35 in the firing step.

Comparative Example 4

A lithium transition metal composite oxide of Comparative Example 4 was obtained in the same manner as in Comparative Example 1 except that in the precursor preparation step, nickel and manganese were weighed so that the molar ratio of nickel and manganese was Ni:Mn=32.3:67.7, and mixed with water, the stirring speed was changed to 150 rpm, and in the firing step, Li/(Ni+Mn) was changed to 1.35.

Comparative Example 5

A lithium transition metal composite oxide of Comparative Example 5 was obtained in the same manner as in Comparative Example 3 except that in the precursor preparation step, nickel, cobalt, and manganese were weighed so that the molar ratio of nickel, cobalt, and manganese was Ni:Co:Mn=34.0:0.9:65.1, and mixed with water, and the temperature of the reaction tank was changed to 25° C.

The BET specific surface area of the lithium transition metal composite oxide according to Examples 1 to 11 and Comparative Examples 1 to 5 was measured under the above-mentioned conditions. The X-ray diffraction measurement using a CuKα ray was performed under the above-mentioned measurement conditions. It was confirmed that all test samples had the X-ray diffraction pattern attributable to the space group R3-m and had the α-NaFeO$_2$ structure. In each sample, a superlattice peak was observed in a range of 20 to 22°.

The half-value width "FWHM (101)" of the (101) plane, the half-value width "FWHM (104)" of the (104) plane, and the half-value width "FWHM (003)" of the (003) plane at the time of attribution to the space group R3-m were recorded using attached software. The ratio "FWHM (101)/FWHM (003)" of the half-value width of the (101) plane to the half-value width of the (003) plane was calculated (Production of Nonaqueous Electrolyte Secondary Battery)

A nonaqueous electrolyte secondary battery was produced by the following procedure using the powder of the positive active material (active material) of each of the above Examples and Comparative Examples.

A coating paste was prepared in which the active material, acetylene black (AB) and polyvinylidene fluoride (PVdF) were kneaded at a ratio of 90:5:5 in terms of a mass ratio and dispersed with N-methylpyrrolidone as a dispersion medium. The coating paste was applied to one surface of an aluminum foil current collector having a thickness of 20 μm, dried, and then pressed to produce a positive electrode plate. The mass of the active material applied per fixed area and the thickness after pressing were equalized so that test conditions were the same among the nonaqueous electrolyte secondary batteries of all Examples and Comparative Examples.

In order to accurately observe the independent behavior of a positive electrode, metallic lithium was brought into close contact with a nickel foil current collector and used for a counter electrode, i.e. a negative electrode. Here, a sufficient amount of metallic lithium was placed on the negative electrode so that the capacity of the nonaqueous electrolyte secondary battery was not limited by the negative electrode.

As a nonaqueous electrolyte (electrolyte solution), a solution obtained by dissolving LiPF$_6$ in a fluorinated ester carbonate solvent in a concentration of 1 mol/L was used. As a separator, a microporous membrane made of polypropylene, the surface of which was modified with polyacrylate, was used. As an outer case, a metal resin composite film made of polyethylene terephthalate (15 μm)/aluminum foil (50 μm)/metal-adhesive polypropylene film (50 μm) was used. The electrode was stored such that open ends of a positive electrode terminal and a negative electrode terminal were externally exposed. Fusion margins with inner surfaces of the aforementioned metal resin composite films facing each other were airtightly sealed except a portion forming an electrolyte solution filling hole, and the electrolyte solution was injected, followed by sealing the electrolyte solution filling hole.

(Initial Charge-Discharge Step)

Next, the obtained battery was subjected to an initial charge-discharge step at 25° C. Charge was constant current-constant voltage charge with a current of 0.1 C and a voltage of 4.7 V, and the condition of the end-of-charge was set at a time point at which the current value was reduced to 0.05 C. Discharge was constant current discharge with a current of 0.1 C and an end voltage of 2.0 V. This charge-discharge was carried out twice. Here, a rest step of 10 minutes was provided after each of charge and discharge. A value obtained by dividing the discharge capacity at the first time by the charge capacity at the first time was recorded as "initial efficiency (%)". The discharge capacity (mAh) at the second time was divided by the mass of the active material contained in the positive electrode and recorded as "0.1 C discharge capacity (mAh/g)".

(Measurement of Potential Retention Rate)

Subsequently, 30 cycles of charge and discharge were performed under the same conditions as in the initial charge-discharge step except that a charge current and a discharge current were ⅓ C, and the condition of the end-of-charge was set at a time point at which the current value was reduced to 0.1 C, and a ratio of an average discharge potential at the first cycle and an average discharge potential at the 30th cycle was recorded as the "potential retention rate (%)".

Table 1 and FIGS. 2 to 4 show the above results.

discharge cycle is suppressed, and thus a secondary battery using the positive active material is useful as a rechargeable battery for vehicles such as a hybrid electric vehicle (HEV), an electric vehicle (EV), and a plug-in hybrid vehicle (PHV), in addition to portable devices such as a mobile phone and a personal computer.

DESCRIPTION OF REFERENCE SIGNS

1: Nonaqueous electrolyte secondary battery
2: Electrode group
3: Battery case
4: Positive electrode terminal
4': Positive electrode lead
5: Negative electrode terminal
5': Negative electrode lead
20: Energy storage unit
30: Energy storage apparatus

The invention claimed is:

1. A positive active material for a nonaqueous electrolyte secondary battery containing a lithium transition metal composite oxide,

TABLE 1

| | Ni/Me | Co/Me | Mn/Me | Li/Me | Specific surface area [m²/g] | FWHM (104) [°] | FWHM (101) [°] | FWHM (003) [°] | FWHM (101)/ FWHM (003) [—] | Potential retention rate [%] | Initial efficiency [%] | 0.1 C discharge capacity [mAh/g] |
|---|---|---|---|---|---|---|---|---|---|---|---|---|
| Example 1 | 0.317 | 0 | 0.683 | 1.38 | 6.7 | 0.2592 | 0.2178 | 0.1580 | 1.378 | 97.0 | 91.8 | 271 |
| Example 2 | 0.318 | 0 | 0.682 | 1.37 | 6.0 | 0.2386 | 0.2046 | 0.1573 | 1.301 | 96.9 | 90.1 | 260 |
| Example 3 | 0.318 | 0 | 0.682 | 1.37 | 5.0 | 0.2339 | 0.1886 | 0.1499 | 1.258 | 96.6 | 89.7 | 255 |
| Example 4 | 0.315 | 0 | 0.685 | 1.38 | 6.8 | 0.2450 | 0.2066 | 0.1570 | 1.316 | 97.0 | 92.0 | 265 |
| Example 5 | 0.315 | 0 | 0.685 | 1.39 | 5.4 | 0.2190 | 0.1849 | 0.1519 | 1.217 | 96.8 | 90.6 | 261 |
| Example 6 | 0.316 | 0 | 0.684 | 1.36 | 7.2 | 0.2581 | 0.2171 | 0.1701 | 1.276 | 98.0 | 92.9 | 270 |
| Example 7 | 0.315 | 0 | 0.685 | 1.36 | 6.3 | 0.2456 | 0.1959 | 0.1524 | 1.285 | 98.0 | 92.3 | 265 |
| Example 8 | 0.315 | 0 | 0.685 | 1.36 | 5.6 | 0.2280 | 0.1737 | 0.1428 | 1.216 | 97.9 | 92.3 | 258 |
| Example 9 | 0.315 | 0 | 0.685 | 1.36 | 7.3 | 0.2488 | 0.1997 | 0.1560 | 1.280 | 98.0 | 94.3 | 268 |
| Example 10 | 0.315 | 0 | 0.685 | 1.36 | 6.3 | 0.2273 | 0.1892 | 0.1505 | 1.257 | 98.0 | 93.6 | 267 |
| Example 11 | 0.328 | 0.002 | 0.670 | 1.35 | 4.8 | 0.2421 | 0.1948 | 0.1527 | 1.276 | 98.0 | 90.6 | 269 |
| Comparative Example 1 | 0.314 | 0 | 0.686 | 1.37 | 5.3 | 0.2984 | 0.2493 | 0.1564 | 1.594 | 96.1 | 86.9 | 223 |
| Comparative Example 2 | 0.314 | 0 | 0.686 | 1.39 | 4.2 | 0.2897 | 0.2498 | 0.1520 | 1.643 | 96.4 | 81.9 | 204 |
| Comparative Example 3 | 0.347 | 0.008 | 0.645 | 1.35 | 5.7 | 0.3133 | 0.2814 | 0.1871 | 1.504 | 96.2 | 84.7 | 244 |
| Comparative Example 4 | 0.323 | 0 | 0.677 | 1.35 | 6.0 | 0.2827 | 0.2397 | 0.1682 | 1.425 | 96.3 | 87.9 | 246 |
| Comparative Example 5 | 0.340 | 0.009 | 0.651 | 1.35 | 6.9 | 0.2805 | 0.2481 | 0.1760 | 1.410 | 96.2 | 85.2 | 251 |

In Table 1 above, it can be seen that although the lithium transition metal composite oxides of all Examples and Comparative Examples satisfy a composition range of the lithium transition metal composite oxide contained in the positive active material according to the present embodiment, the specific surface areas and crystallinity are different due to different production conditions (reaction temperature, stirring conditions, etc. at the time of preparing the precursor).

It can be seen from FIG. 2 that a high potential retention rate is obtained when the FWHM (104) is 0.27° or less. On the other hand, it can be seen from FIG. 3 that the FWHM (003) has no correlation with the potential retention rate.

INDUSTRIAL APPLICABILITY

According to the present invention, it is possible to provide a "lithium-excess-type" positive active material in which the decrease in potential associated with the charge-wherein
the lithium transition metal composite oxide has an α-NaFeO₂ structure,
a molar ratio Li/Me of Li to a transition metal (Me) in the lithium transition metal composite oxide is 1.25≤Li/Me≤1.45,
Ni and Mn are contained as the transition metal (Me),
in the lithium transition metal composite oxide, an X-ray diffraction pattern attributable to a space group R3-m is included, and a half-value width for a diffraction peak of a (104) plane at a Miller index hkl in X-ray diffraction measurement using a CuKα ray is 0.27° or less, and
a molar ratio Co/Me of Co to Me in the lithium transition metal composite oxide is 0 or more and less than 0.05.

2. The positive active material for a nonaqueous electrolyte secondary battery according to claim 1, wherein the molar ratio Li/Me is 1.3≤Li/Me≤1.45.

3. The positive active material for a nonaqueous electrolyte secondary battery according to claim 1, wherein the molar ratio Li/Me is 1.25≤Li/Me≤1.4.

4. The positive active material for a nonaqueous electrolyte secondary battery according to claim 1, wherein a molar ratio Ni/Me of Ni to Me is 0.2 or more.

5. The positive active material for a nonaqueous electrolyte secondary battery according to claim 4, wherein the molar ratio Ni/Me is 0.25 or more.

6. The positive active material for a nonaqueous electrolyte secondary battery according to claim 1, wherein the molar ratio Ni/Me is less than 0.5.

7. The positive active material for a nonaqueous electrolyte secondary battery according to claim 6, wherein the molar ratio Ni/Me is 0.4 or less.

8. The positive active material for a nonaqueous electrolyte secondary battery according to claim 1, wherein a molar ratio Mn/Me of Mn to Me is more than 0.5.

9. The positive active material for a nonaqueous electrolyte secondary battery according to claim 8, wherein the molar ratio Mn/Me is 0.6 or more.

10. The positive active material for a nonaqueous electrolyte secondary battery according to claim 1, wherein the molar ratio Mn/Me is 0.8 or less.

11. The positive active material for a nonaqueous electrolyte secondary battery according to claim 10, wherein the molar ratio Mn/Me is 0.75 or less.

12. The positive active material for a nonaqueous electrolyte secondary battery according to claim 1, wherein the half-value width for the diffraction peak of the (104) plane is 0.21° or more and 0.27° or less.

13. The active material for a nonaqueous electrolyte secondary battery according to claim 1, wherein in the lithium transition metal composite oxide, the half-value width for the diffraction peak of a (101) plane at the Miller index hkl in X-ray diffraction measurement using the CuKα ray is 0.22° or less.

14. The positive active material for a nonaqueous electrolyte secondary battery according to claim 1, wherein in the lithium transition metal composite oxide, the half-value width for the diffraction peak of a (003) plane at the Miller index hkl in X-ray diffraction measurement using the CuKα ray is 0.175° or less.

15. The positive active material for a nonaqueous electrolyte secondary battery according to claim 14, wherein in the lithium transition metal composite oxide, a ratio of the half-value width for the diffraction peak of the (101) plane to the half-value width for the diffraction peak of the (003) plane is 1.40 or less.

16. The positive active material for a nonaqueous electrolyte secondary battery according to claim 1, wherein an aluminum compound is present on at least a surface of the lithium transition metal composite oxide.

17. A positive electrode for a nonaqueous electrolyte secondary battery containing the positive active material according to claim 1.

18. A nonaqueous electrolyte secondary battery comprising the positive electrode according to claim 17, a negative electrode, and a nonaqueous electrolyte.

19. The positive active material for a nonaqueous electrolyte secondary battery according to claim 14, wherein in the lithium transition metal composite oxide, a ratio of the half-value width for the diffraction peak of the (003) plane to the half-value width for the diffraction peak of the (104) plane is 0.524 or more.

20. A positive active material for a nonaqueous electrolyte secondary battery containing a lithium transition metal composite oxide,
wherein
the lithium transition metal composite oxide has an α-NaFeO$_2$ structure,
a molar ratio Li/Me of Li to a transition metal (Me) in the lithium transition metal composite oxide is 1.25≤Li/Me≤1.45,
Ni and Mn are contained as the transition metal (Me),
a molar ratio Mn/Me is 0.6 or more and 0.75 or less,
a molar ratio Ni/Me is 0.25 or more and 0.4 or less,
a molar ratio Co/Me is 0 or more and less than 0.05,
in the lithium transition metal composite oxide, an X-ray diffraction pattern attributable to a space group R3-m is included, and a half-value width for a diffraction peak of a (104) plane at a Miller index hkl in X-ray diffraction measurement using a CuKα ray is 0.21° or more and 0.27° or less,
the half-value width for the diffraction peak of a (003) plane at the Miller index hkl in X-ray diffraction measurement using the CuKα ray is 0.175° or less, and
the lithium transition metal composite oxide is produced by mixing a transition metal carbonate salt precursor with a lithium compound and firing the mixture.

* * * * *